(12) United States Patent
Yamanaka et al.

(10) Patent No.: US 6,629,445 B2
(45) Date of Patent: Oct. 7, 2003

(54) METHOD OF CALIBRATING SENSITIVITY OF PRESSURE SENSING CELLS OF VEHICLE PASSENGER SEAT

(75) Inventors: Tomoharu Yamanaka, Kuwana (JP); Yuzo Imoto, Chita-gun (JP); Takehiro Sengoku, Kariya (JP); Kazuo Masaki, Chita (JP); Katsushi Mizushima, Yokkaichi (JP)

(73) Assignee: Denso Corporation, Kariya (JP)

( * ) Notice: Subject to any disclaimer, the term of this patent is extended or adjusted under 35 U.S.C. 154(b) by 123 days.

(21) Appl. No.: 09/898,036

(22) Filed: Jul. 5, 2001

(65) Prior Publication Data

US 2002/0002855 A1 Jan. 10, 2002

(30) Foreign Application Priority Data

| Jul. 5, 2000 | (JP) | 2000-203502 |
| Jul. 5, 2000 | (JP) | 2000-203550 |
| Aug. 25, 2000 | (JP) | 2000-255288 |
| Aug. 25, 2000 | (JP) | 2000-255498 |
| Aug. 25, 2000 | (JP) | 2000-256267 |

(51) Int. Cl.$^7$ .......... G01L 25/00; G01G 19/44; G01G 23/01
(52) U.S. Cl. .......... 73/1.13; 73/1.15
(58) Field of Search .......... 73/1.13, 1.15, 73/866.4; 177/50

(56) References Cited

U.S. PATENT DOCUMENTS

| 6,539,771 B1 | * | 4/2003 | Davidson et al. | 73/1.13 |
| 2002/0002854 A1 | * | 1/2002 | Imoto et al. | 73/1.13 |
| 2002/0066302 A1 | * | 6/2002 | Hamm et al. | 73/1.13 |

* cited by examiner

Primary Examiner—Thomas P. Noland
(74) Attorney, Agent, or Firm—Harness, Dickey & Pierce, PLC (57) ABSTRACT

A method of calibrating sensitivities of a plurality of pressure sensing cells are disposed at a passenger seat to detect presence of a vehicle passenger. The method is comprised of the following steps: pressing a presser against the passenger seat; detecting output signal levels of the sensing cells; and adjusting sensitivity of the pressure sensing cells according to the output signal levels while the presser is pressed against the seat.

29 Claims, 14 Drawing Sheets

METHOD OF CALIBRATING SENSITIVITY OF PRESSURE SENSING CELLS OF VEHICLE PASSENGER SEAT

CROSS REFERENCE TO RELATED APPLICATION

The present application is based on and claims priority from the following Japanese Patent Applications: 2000-203502, filed Jul. 5, 2000; 2000-203550, filed Jul. 5, 2000; 2000-255288, filed Aug. 25, 2000; 2000-255498, filed Aug. 25, 2000; and 2000-256267, filed Aug. 25, 2000; the contents of which are incorporated herein by reference.

BACKGROUND OF THE INVENTION

1. Field of the Invention

The present invention relates to a vehicle passenger sensing system that includes a plurality of pressure sensing cells disposed in a vehicle passenger seat to sense presence of a passenger.

2. Description of the Related Art

In a vehicle that is equipped with a passenger's air bag, it is necessary to sense presence of a passenger seated on a passenger seat in order to prevent a passenger's air bag from inflating when no passenger is seated on the seat.

Even if a passenger system senses the presence of a passenger and the passenger's air bag operates properly at a certain accident, such an air bag may harm the passenger if the passenger is a child or a baby.

Therefore, it is necessary to sense whether the passenger is a child or not. Although, weight sensing is generally useful, mere weight sensing cannot tell whether the passenger is a child or not if a seat is reclined to a laid down position. If a child seated on a child seat is fastened to the passenger seat, the sensed weight is heavier than the child's weight.

SUMMARY OF THE INVENTION

Therefore, a main object of the invention is to provide an improved passenger sensing system that can correctly tell whether a passenger is a child or not.

Another object of the invention is to provide a passenger sensing system that can correctly sense the weight of the passenger from a plurality of weight sensing cells regardless of deviation in the sensitivities of the sensing cells.

A method of calibrating sensitivities of a plurality of pressure sensing cells disposed at a passenger seat to detect presence of a vehicle passenger according to a main aspect of the invention is comprised of the following steps: pressing a presser against the passenger seat; detecting output signal levels of the sensing cells; and adjusting sensitivity of the pressure sensing cells according to the output signal levels while the presser is pressed against the seat.

The step of pressing may be comprised of a step of applying equal pressures on all the sensing cells and a step of removing the pressures. The presser may be a flexible bag filled with liquid. The flexible bag may have a surface area sufficient to apply the pressure on all the sensing cells concurrently. The flexible bag may be comprised of a plurality of portions for separately applying pressures on a middle of the seat and sides of the seat.

The method according to the main aspect of the invention may be comprised of a step of estimating final output signal levels before the step of adjusting. The step of estimating may be comprised of a step of estimating a change in output signal level of the sensing cells when the passenger seat is pressed by the presser. The step of estimating may be comprised of a step of estimating a final output signal level according to a response relationship between pressure applied to the sensors and output signal levels of the sensor. The final output level may be estimated according to a decreasing rate of output signal level of the sensing cell.

In the method according to the main aspect of the invention, the step of adjusting may be comprised of separate steps of adjusting respective sensing cells.

In the method according to the main aspect of the invention, the steps of pressing, detecting and adjusting may be carried out for those of the sensing cells disposed at predetermined sections of the passenger seat.

In the method according to the main aspect of the invention, the step of adjusting may be comprised of a step of dividing the passenger seat to a plurality of sections, and a step of applying different weight of importance to each different section to provide a value to correct sensitivity of the each section.

In the method according to the main aspect of the invention, the step of adjusting may be comprised of a step of dividing the passenger seat to a plurality of sections, and a step of correcting sensitivity of the sensing cells of each section.

In the method according to the main aspect of the invention, the presser may be comprised of a bag having a contact surface fitted to the surface of the passenger seat. The presser may be formed of a plurality of bags having a contact surface fitted to the surface of each section of the passenger seat.

In the method according to the main aspect of the invention, the step of detecting may be comprised of a step of detecting a shift of a distribution pattern of output signal levels of the sensing cells, and the step of adjusting may be comprised of a step of correcting the shift according to the output signal levels.

In the method according to the main aspect of the invention, the presser may be comprised of means for profiling a surface of passenger's buttocks. The means may be comprised of a plurality of pistons having edges, each of which is controlled to follow a portion of the surface of passenger's buttocks.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A vehicle passenger sensing system is described with reference to FIGS. 1–9.

Figure 4:
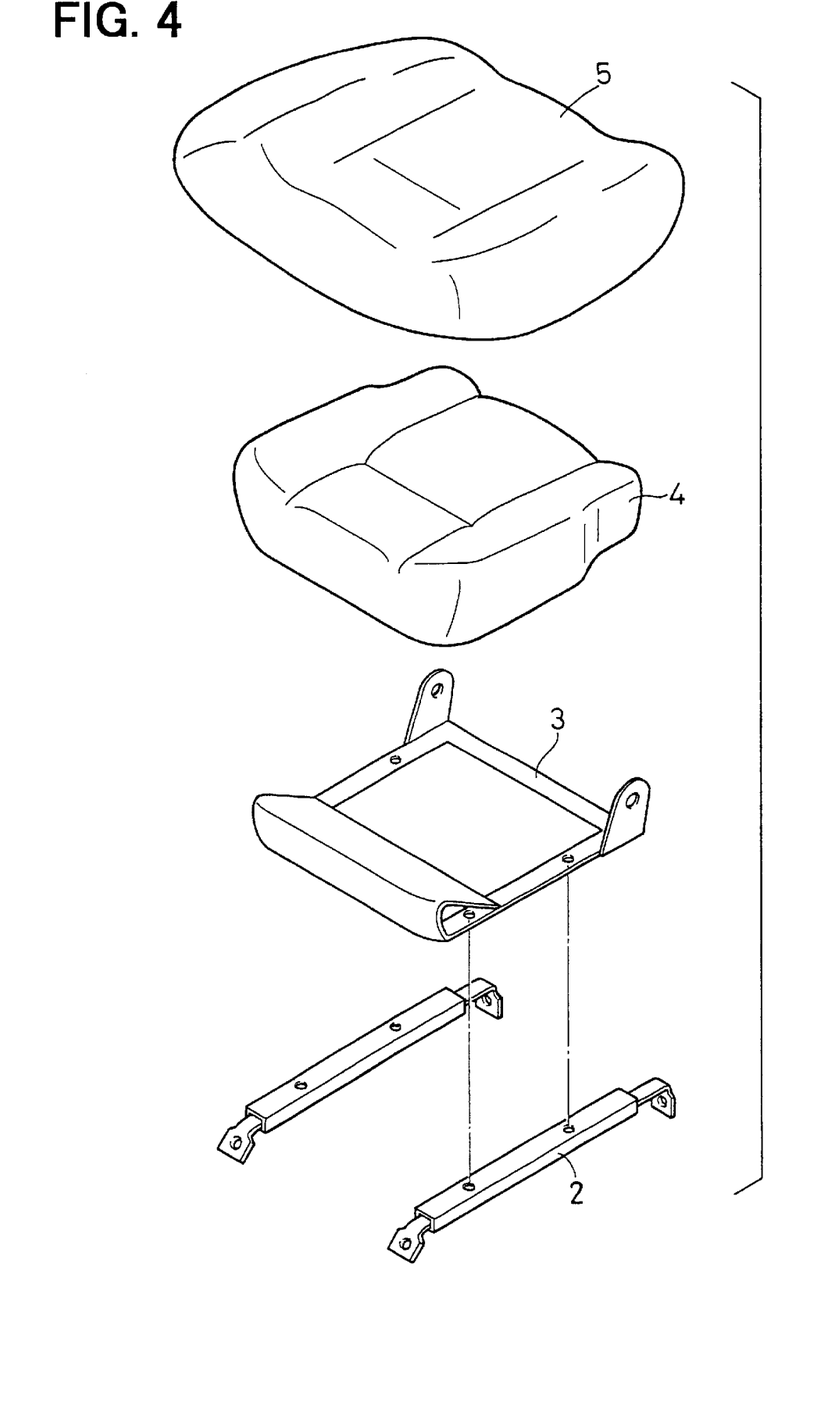
FIG. 4 is an exploded perspective view of the passenger seat.
Figure 5A:
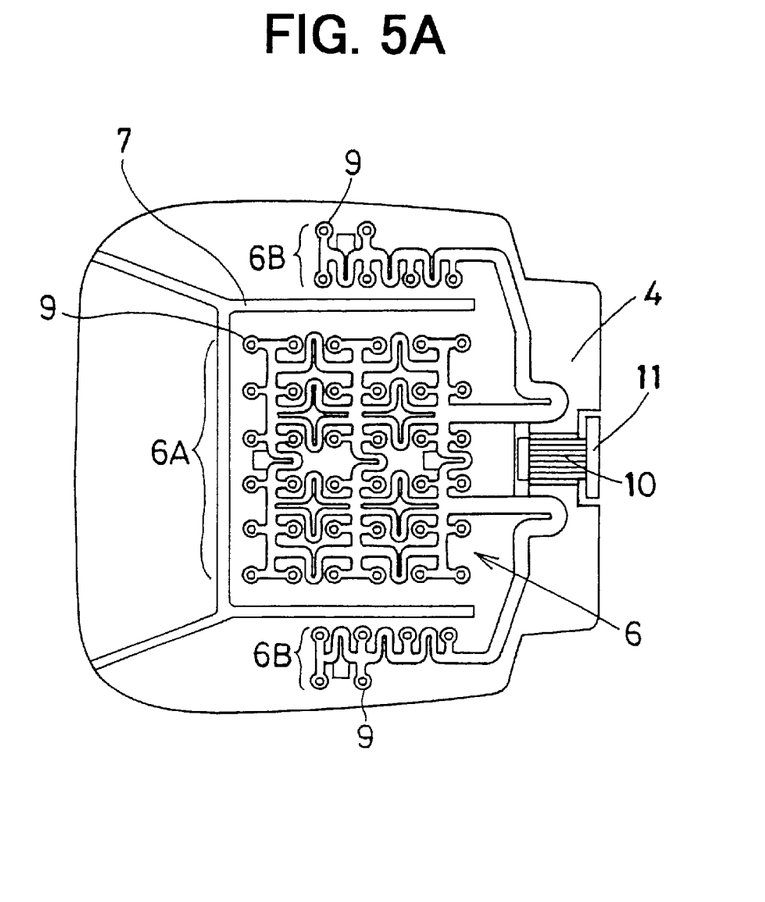
FIGS. 5A and 5B are plan and cross-sectional views of a seat cushion that includes a sensor mat.
Figure 5B:
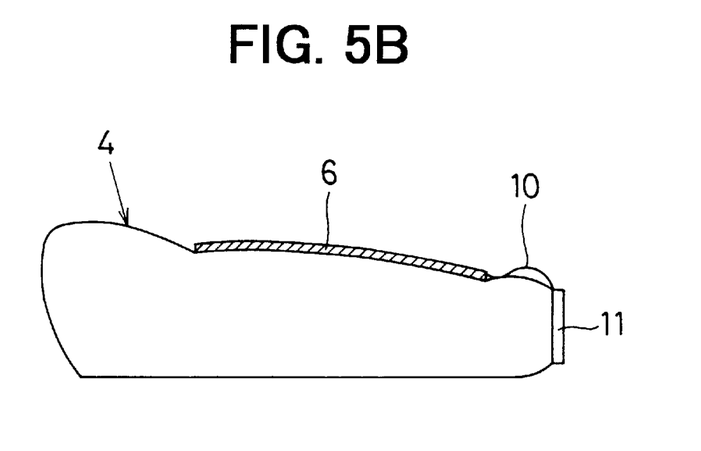

As shown in FIGS. 4 and 5, a passenger seat 1 is comprised of a pair of rails 2, an anchor member 3 anchored by the pair of rails 2, a seat cushion 4 made of polyurethane foam, a seat skin 5 that covers the seat cushion and a seat mat 6 disposed between the seat cushion 4 and the seat skin 5.

Trenches 7 are formed on the upper side of the cushion 4 to wring or hold portions of the seat skin 5 therein to stretch the seat skin 5 over the upper surface of the seat cushion 4. For this purpose, a pair of pocket-like folds 8 is formed at the portions of the seat skin 5.

The sensor mat 6 has a plurality of sensing cells 9, each of which converts a pressure to an amount of electric resistance. The sensor mat 6 is comprised of a first sensor section 6a disposed at the central portion of the seat cushion 4 between a pair of the parallel trenches 7 and a pair of second sensor sections 6b disposed outside the parallel trenches 7. A plurality of sensing cells 9 is uniformly distributed at the first and second sensor sections 6a and 6b in both longitudinal and lateral directions. The sensor mat 6 is connected to an ECU 11 via a printed circuit board 10 to give it electric signals relative to the pressure.

The ECU 11 is an electronic control unit that includes a microcomputer, which is disposed at the center of the rear portion of the cushion 4, as shown in FIG. 5A. The ECU 11 calculates a total weight applied to the cushion and a pattern of the weight distribution according to the signals from the respective sensing cells and detects whether a passenger is present or not and whether the passenger is a child or not in the following manner:

a) it is judged that a passenger is present if the total weight is larger than a predetermined value, and otherwise, it is judged that no one is present.

b) it is judged that a child seat is used if the weight distribution pattern comes under a predetermined pattern.

c) whether the passenger is a child or not is judged according to the total weight and the pattern of the weight distribution pattern.

A passenger seat is manufactured in the following manner.

(1) The cushion 4 is mounted on the anchor member 3.

Figure 6:
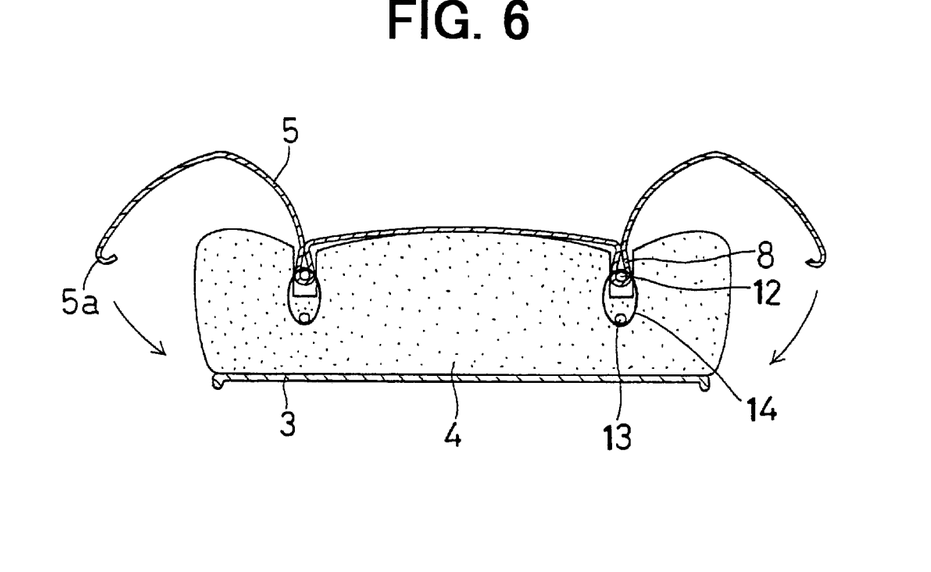
FIG. 6 is a schematic diagram illustrating a step of fixing a seat skin.

(2) Wires 13 shown in FIG. 6 are fixed to the bottom of the trenches 7, and the sensor mat 6 is put on the upper surface of the cushion 4 and temporarily fixed thereto.

(3) Then, wires 12 are inserted into the pocket-like folds 8 and thrusted into the pair of trenches 7.

The seat skin 5 is fixed to the seat cushion in the following manner.

(4) The seat skin 5 is stretched over the sensor mat 6 and the seat cushion 4 so that the middle portion of the seat skin 5 can be positioned at the middle of the cushion 4. Then, the wires 12 and 13 in each trench 7 are clamped by C-shaped clamp 14.

Figure 7:
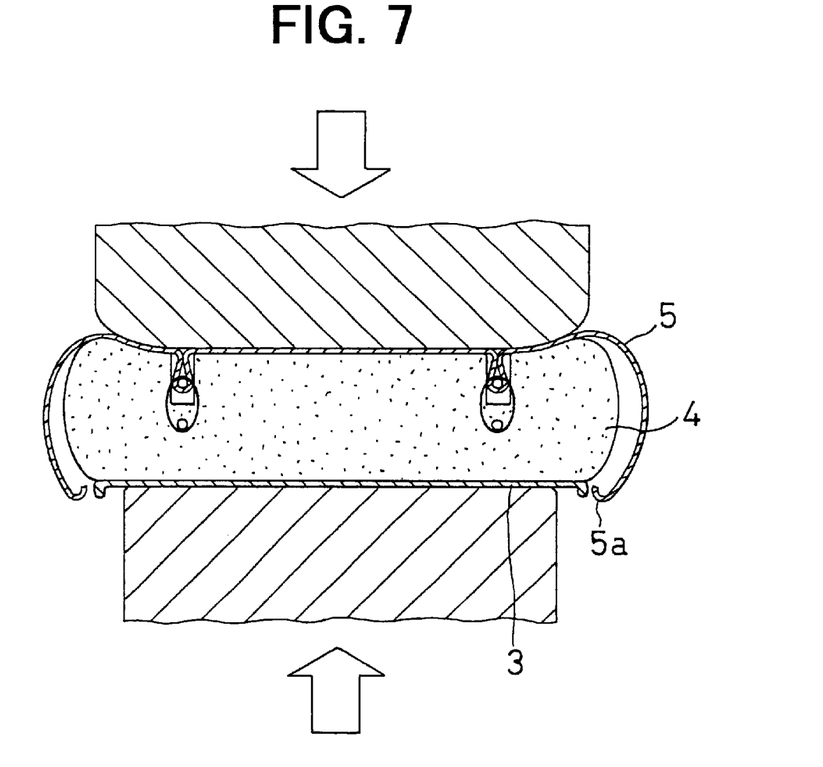
FIG. 7 is a schematic diagram illustrating a step of fixing a seat skin.

(5) The sides of the seat skin5 are respectively extended to cover the sides of the cushion 4 so that hooks 5a formed at the edges of the seat skins 5 can engage projections 3a formed at edges of the anchor member 3. In order to prevent wrinkles of the seat skin 5, the cushion 4 is pressed from both upper and lower sides, as shown in FIG. 7 before the hooks 5a are engaged with the projections 3a.

(6) Finally, the sensitivity of the sensing cells 9 of the sensor mat 6 is calibrated in the following manner.

Figure 1:
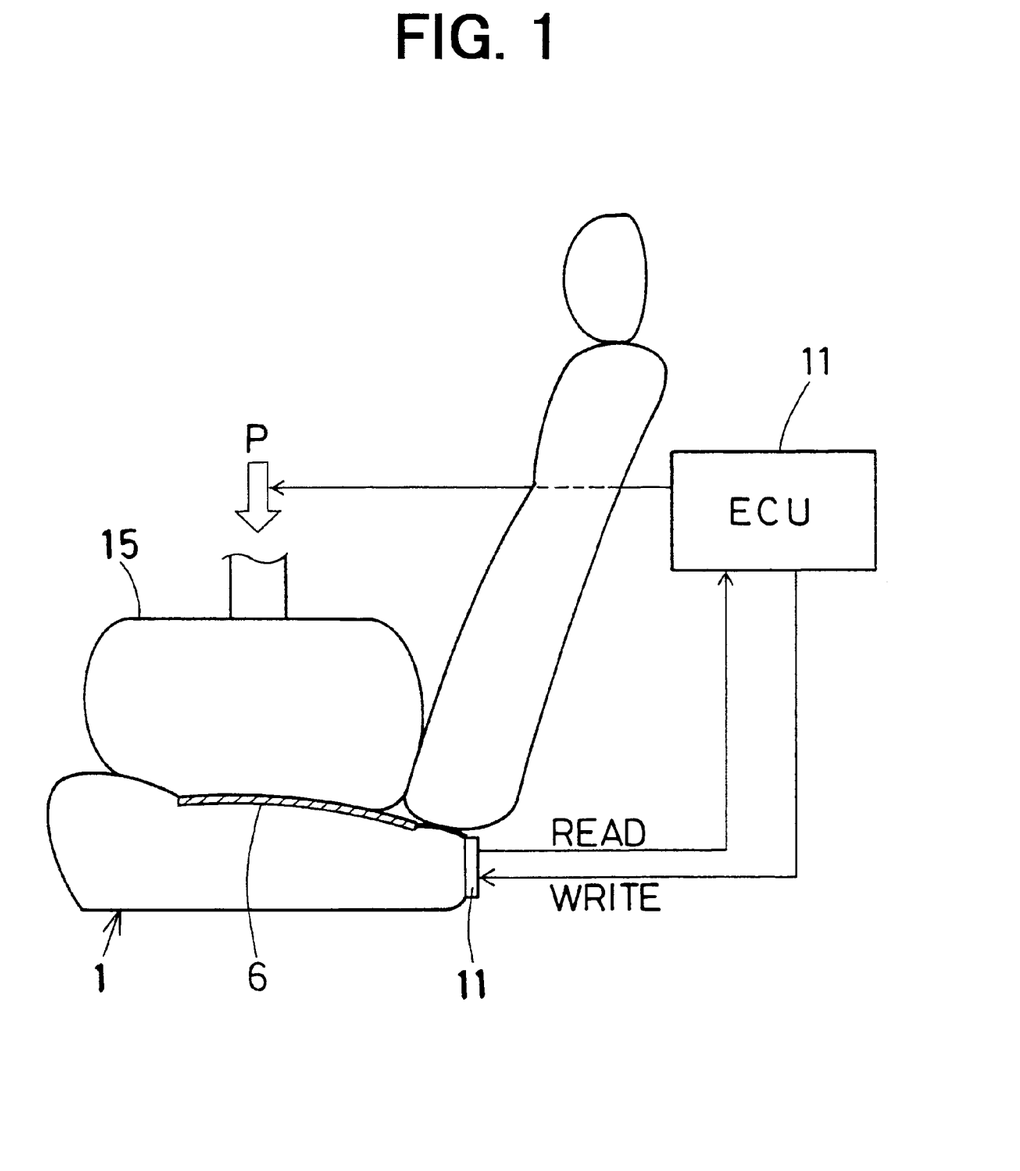
FIG. 1 is a schematic diagram of a method of calibrating sensitivities of a plurality of weight sensing cells according to a first embodiment of the invention.
Figure 2A:
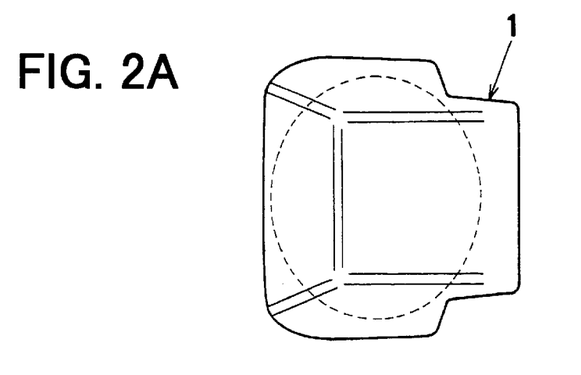
FIGS. 2A, 2B and 2C are schematic diagrams illustrating alternative steps of the method of calibrating sensitivities of a plurality of weight sensing cells according to the first embodiment.
Figure 2B:
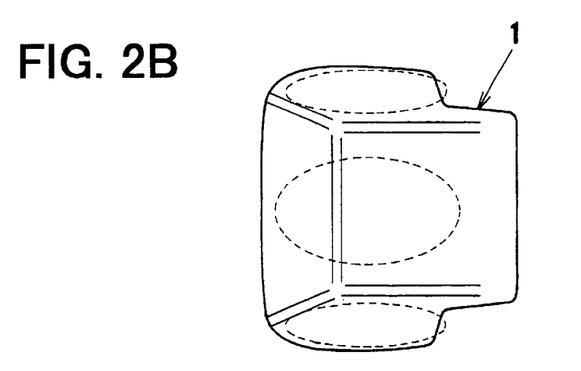
Figure 2C:
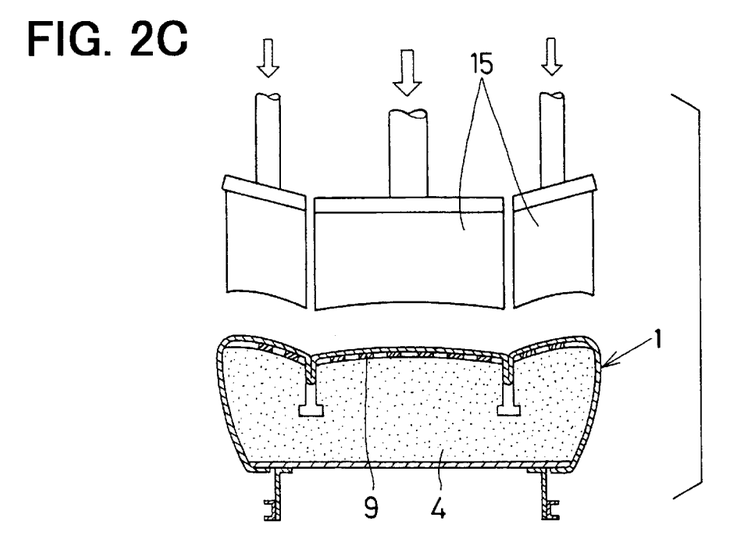
Figure 3A:
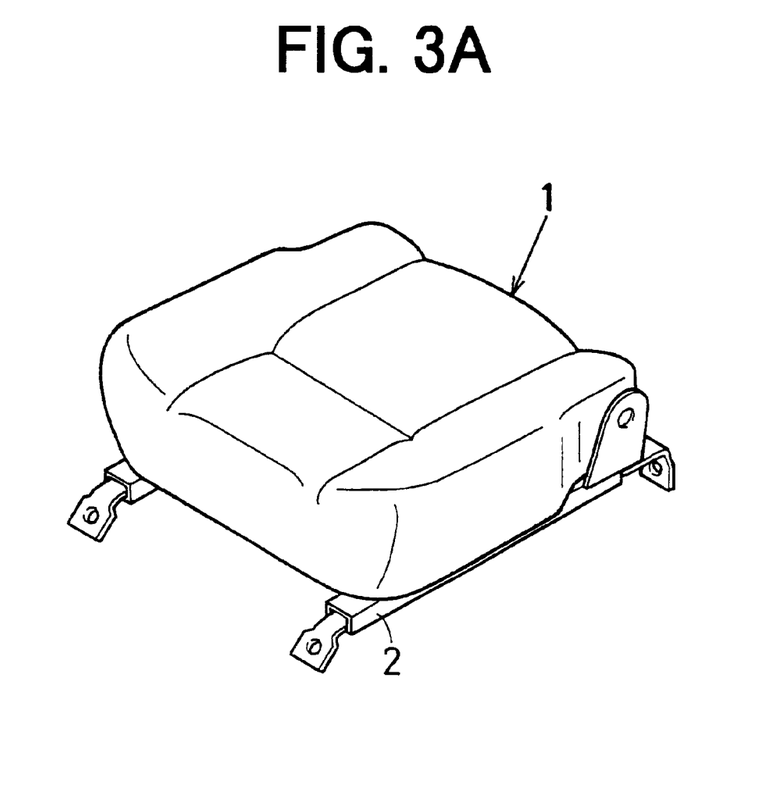
FIGS. 3A and 3B are perspective and cross-sectional views of a passenger seat.
Figure 3B:
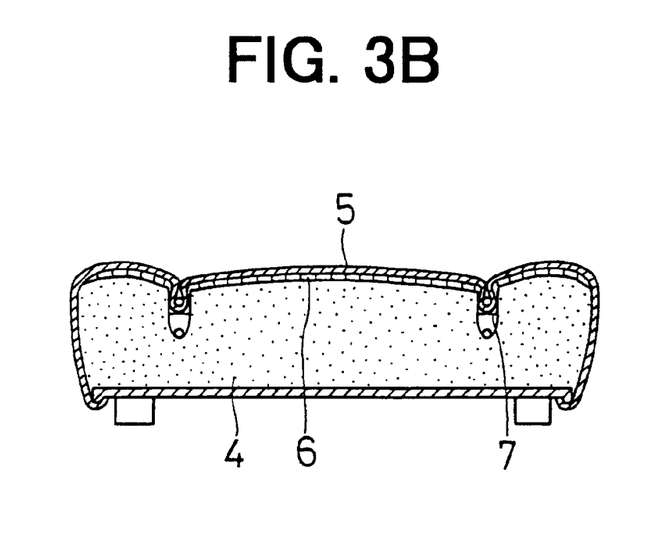

Step 1: A fluid-contained flexible bag 15 is put on a portion of the upper surface of the seat 1 and an amount of pressure is applied to the seat via the bag 15, as shown in FIG. 1. The flexible bag 15 is made of rubber or resinous material and contains a kind of fluid such as gas, liquid, or gel. The pressure can be applied to a single large area, as shown in FIG. 2A or divided areas, as shown in FIG. 2B. If the pressure is applied to a plurality of areas, a plurality of flexible bags may be used, as shown in FIG. 2C.

Step 2: The output signal of each sensing cell 9 is read by a controller of the ECU 11 and is calibrated in the following manner.

Even if a pressure Pa is applied to one of the sensing cells 9 aiming that the sensing cell 9 provides an output signal O1, the sensor actually provides the same output signal O1 only when pressure Pi is applied:

a) C1=Pi/Pa, by which the actual pressure is multiplied, or b) C2=Pi−Pa, which is added to the actual pressure.

Even if pressure Pi is applied to a sensor aiming that the sensor provides an output signal Oa, the sensor actually provides an output signal O1:

c) C3=Oa/O1, by which the actual output signal is multiplied, or d) C4=Oa−O1, which is added to the actual output signal.

Step 3: The output signal of each sensor is estimated in the following way before it is finally detected in order to shorten the calibration time.

Figure 8A:
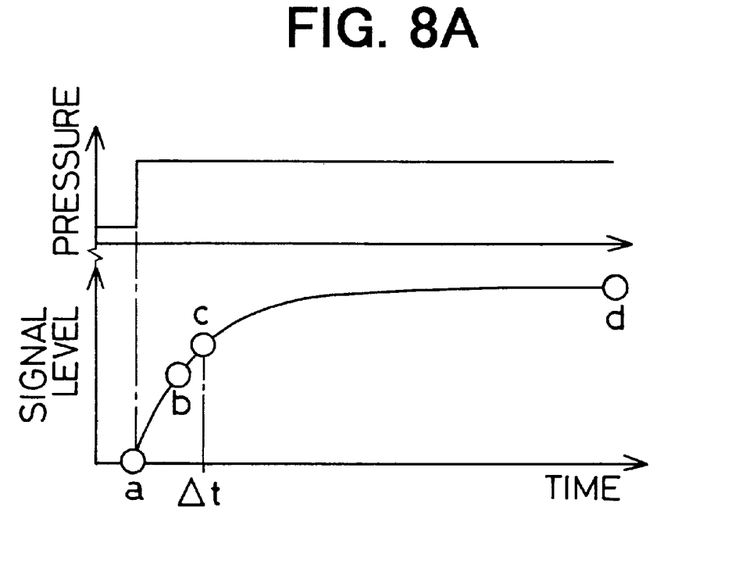
FIGS. 8A and 8B are graphs showing a method of calibrating signal levels of sensing cells according to a second embodiment of the invention.

The final output signal is estimated from a change in the output signal of each sensing cell 9 after the calibrated pressure is applied. For example, a response characteristic of the sensing cell 9 to the actual calibration, as shown in FIG.

8A, is recorded, and is compared with a change in the output signals between two or more points.

For example, if one of the sensing cells 9 is applied a step input signal that corresponds to a pressure to be applied, the output signal thereof becomes as high as 63% at time Δt after the input signal is applied. In the meantime, the time constant Δt of the sensing cell 9 is detected beforehand. Therefore, the final output signal can be estimated from a value at point c in FIG. 8A if the value is multiplied by 1/0.63. Points b or d can be added to increase the accuracy of the estimation.

Figure 8B:
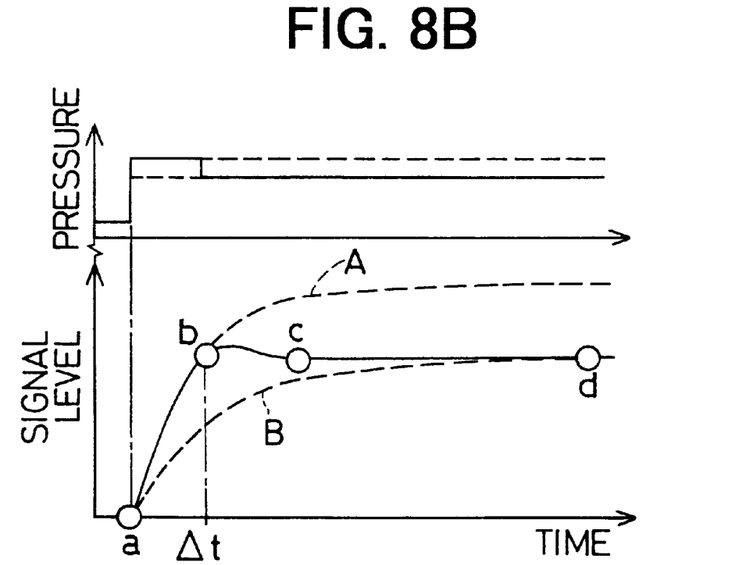
Figure 9:
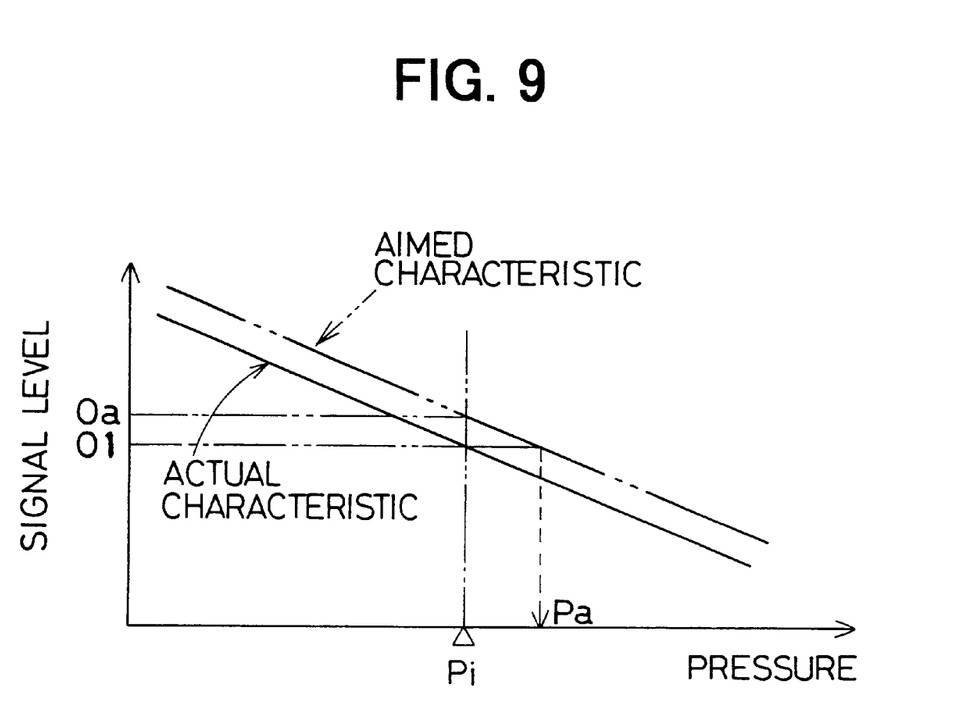
FIG. 9 is a graph showing an idea of calibration of a sensing cell according to the second embodiment.

Variation: Before the final output signal is estimated, an initial pressure that is larger than a calibration pressure is applied to the sensing cells 9. The final output signal is estimated after the initial pressure is reduced to the calibration pressure, as shown in FIG. 8B. For example, a broken line A shows an output signal when the initial pressure that is larger than the calibration pressure is applied to the sensing cell 9. A broken line B shows the same output signal as that shown in FIG. 8A when the calibration pressure is applied to the sensing cell 9. If the initial pressure is 1/0.63 times as much as the calibration pressure, the output signal at point b that appears at time Δt after the input signal is applied can be substituted for the final output signal at point d. The output signal at point c appears after the initial pressure is reduced to the calibration pressure and can be also substituted for the final output signal.

A method of calibrating the sensitivities of the sensing cells according to a second embodiment of the invention is described with reference to FIGS. 10A–10C.

Figure 10A:
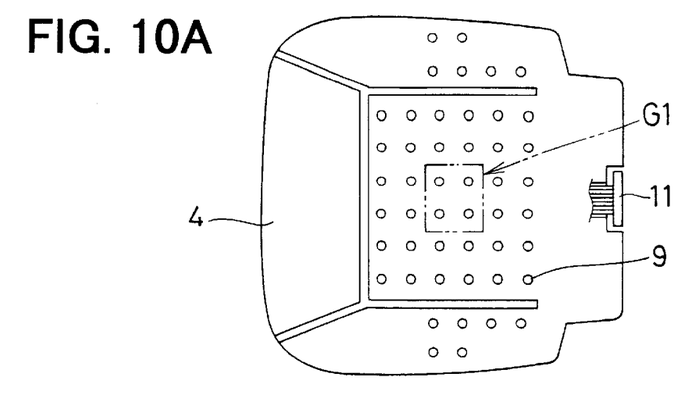
FIGS. 10A, 10B and 10C are schematic diagrams of a seat for illustrating a method of calibrating the sensitivities according to a third embodiment of the invention.
Figure 10B:
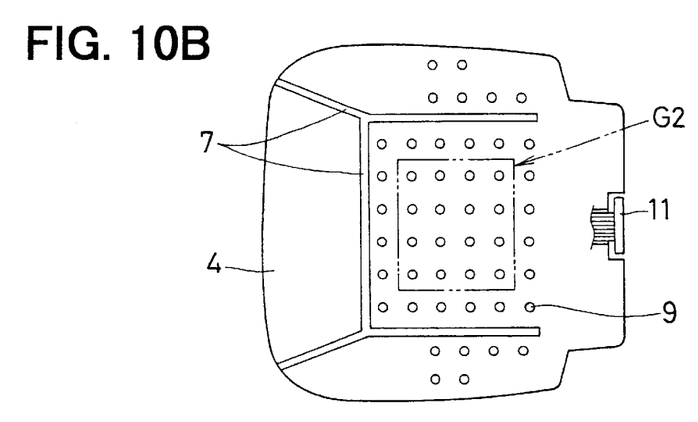
Figure 10C:
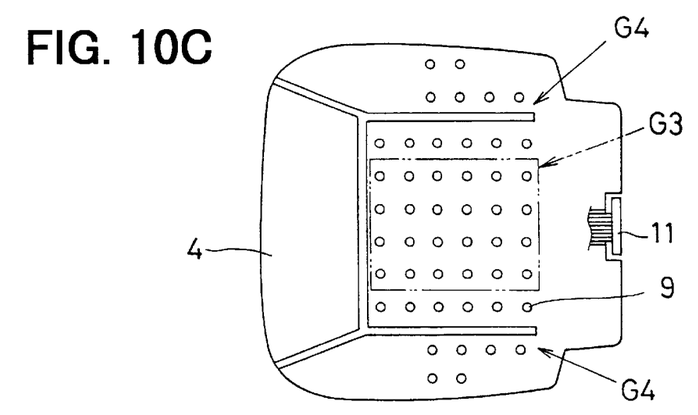

A plurality of sensing cells are grouped into two or more sections G1–G4 as shown in FIGS. 10A–10C, and the sensor sells 9 of a section that is disposed at more center of the seat are given more weight to be calibrated. For example, a mean value the output signals of the sensors in each section is used for the calibration.

A method of calibrating the sensitivities of the sensing cells according to a third embodiment of the invention is described with reference to FIGS. 11A, 11B, 11C and 11D.

Figure 11A:
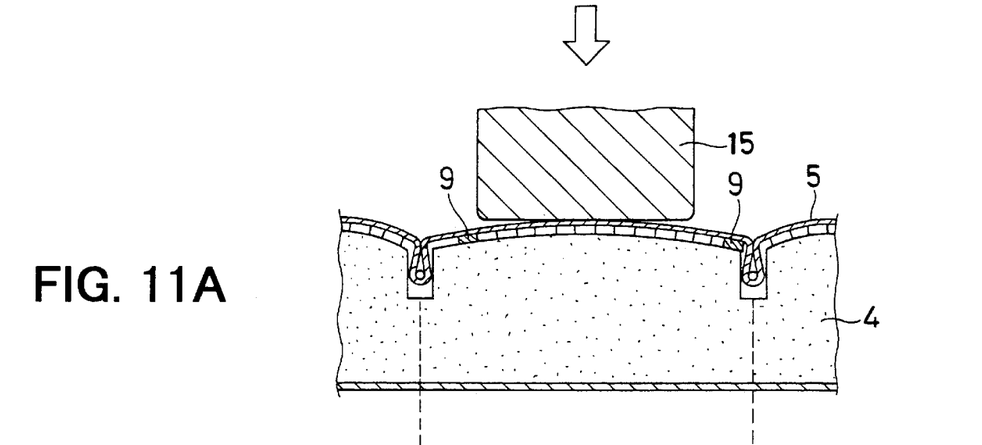
FIGS. 11A and 11C are schematic diagrams of a method of calibrating signal levels of sensing cells according to a fourth embodiment of the invention.

At first, a pair of sensing cells 9 disposed to be approximately symmetrical with each other is selected, and a presser 15 is pressed against the portion of the seat skin 5 between the pair of sensing cells, as shown in FIG. 11A.

Figure 11B:
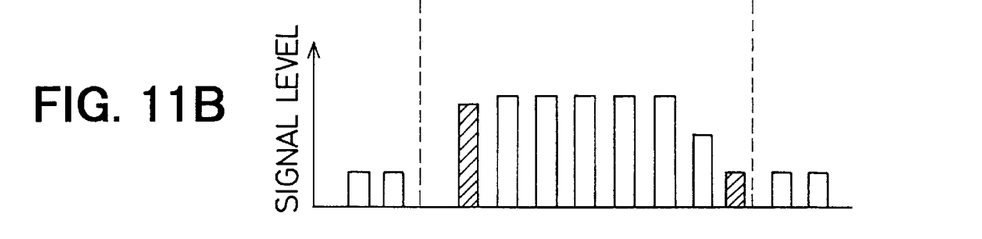
FIGS. 11B and 11D are graph showing signal levels of the sensing cells.
Figure 11C:
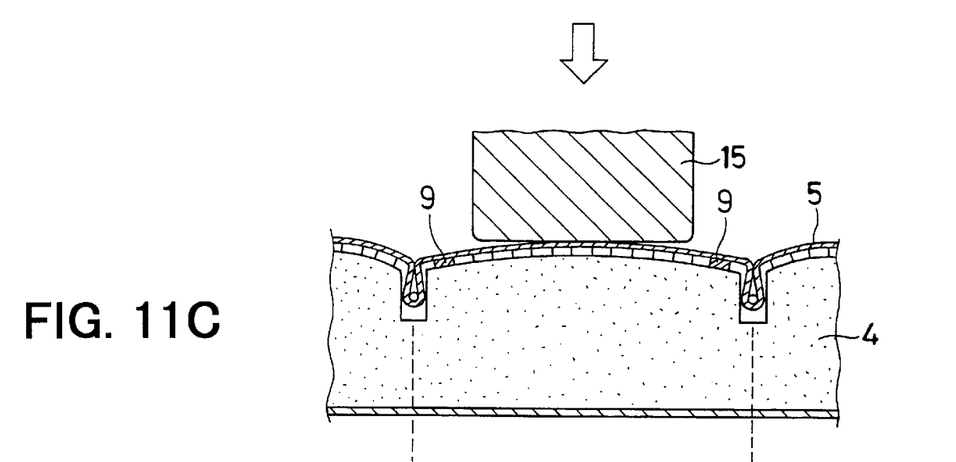
Figure 11D:
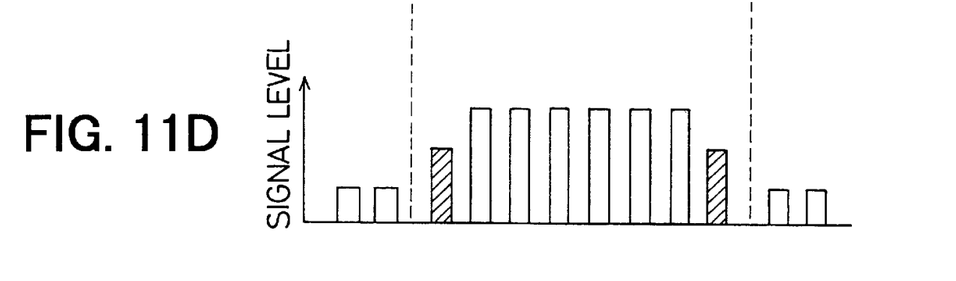

Then, the output signal levels of the pair of sensing cells 9 and sensing cells adjacent to the pair are detected, as shown in FIG. 11B.

Subsequently, the detected output signals are compared with a normal distribution pattern of the sensing cells to estimate an amount of difference in pattern. For example, it is estimated from the pattern shown in FIG. 11B that the sensor mat 6 is shifted from the normal position shown in FIGS. 11C and 11D by an interval between two adjacent sensing cells 9.

A method of measuring the output signal levels of the sensing cells is described with reference to FIGS. 12–17.

Figure 12:
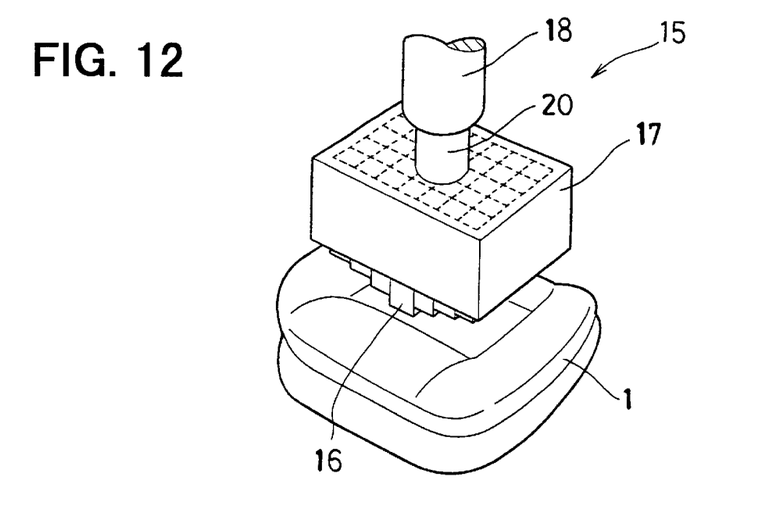
FIG. 12 is a schematic diagram of a method of calibrating signal levels of sensing cells according to a fifth embodiment of the invention.

Firstly, a presser 15, which is comprised of a presser block 17 and a drive member 18, is pressed against the seat 1 to detect the output signal level of each of the sensing cells 9.

Figure 13:
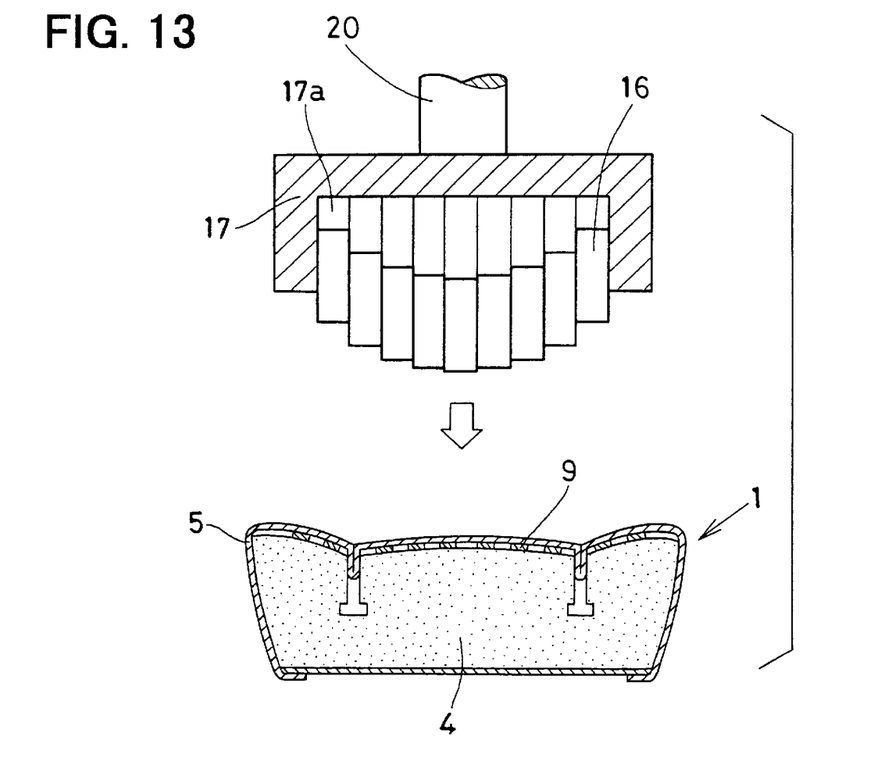
FIG. 13 is a schematic diagram of a step of the method of calibrating the signal levels of sensing cells according to the fifth embodiment.

The presser block 17 has a plurality of lattice-shape compartments 17a, in which presser fingers 16 are respectively held so that the edges thereof, as a whole, form a predetermined weight distribution pattern. The presser fingers 16 are moved in the compartments so that the edges thereof can form the weight distribution pattern and, thereafter, fixed by screws 19 or the like. The drive member 18 includes an actuator (not shown) for moving the presser block 17 up or down via a drive shaft 20.

Figure 14:
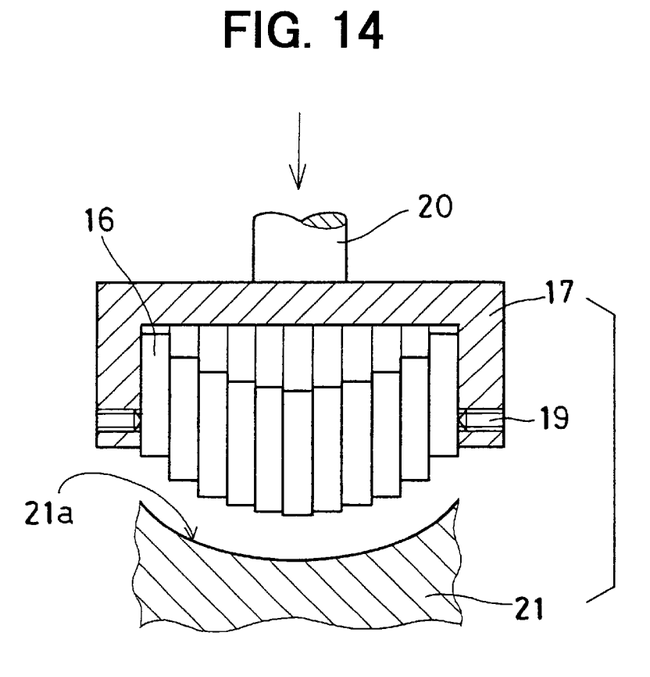
FIG. 14 is a schematic diagram of a step of the method of calibrating the signal levels of sensing cells according to the fifth embodiment.
Figure 15:
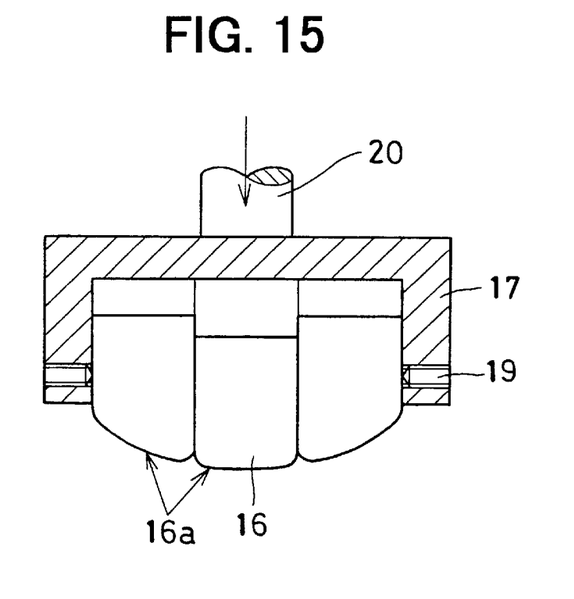
FIG. 15 is a schematic diagram of a step of the method of calibrating the signal levels of sensing cells according to the fifth embodiment.

Copy boards 21 of the weight distribution patters of a man, woman and a baby on a child seat are prepared. For example, all the presser fingers 16 are pressed against a copy board 21 of the weight distribution pattern, which corresponds to a 6-year child model seated on a passenger seat, so that the edges of the presser fingers can follow the surface profile 21a of the copy board 21, as shown in FIG. 14. The number of the presser fingers 16 can be reduced if the edges thereof are formed to imitate the profile of the buttocks, as shown in FIG. 15.

Secondly, each of the output signals of the sensing cells 9 is compared with a reference level that corresponds to the same position of a model weight distribution pattern.

If an output signal of one of the sensing cells 9 is not correct, such a sensing cell is calibrated in the manner described above.

Figure 16:
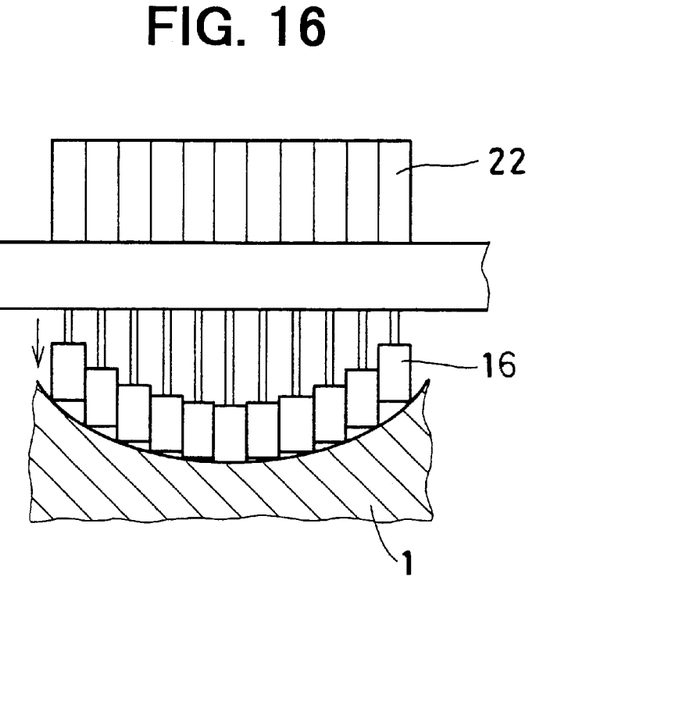
FIG. 16 is a schematic diagram of a step of the method of calibrating the signal levels of sensing cells according to the fifth embodiment.
Figure 17:
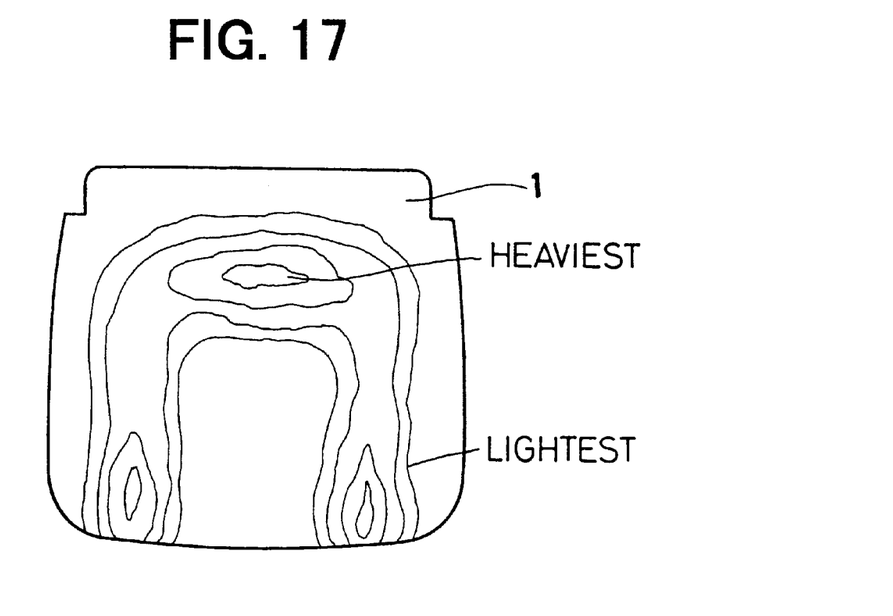
FIG. 17 is a schematic diagram of a step of the method of calibrating the signal levels of sensing cells according to the fifth embodiment.

The presser 15 may be comprised of a plurality of pairs of a pressure cylinder 22 and a piston finger 16, as shown in FIG. 16. Each pair of the pressure cylinder 22 and the piston finger 16 is electronically controlled according to a map that corresponds to a pressure isobar pattern shown in FIG. 17.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims.

What is claimed is:

1. A method of calibrating sensitivities of a plurality of pressure sensing cells disposed at a passenger seat to detect presence of a vehicle passenger, said method comprising the steps of:

pressing a presser against said passenger seat;

detecting output signal levels of said sensing cells; and adjusting sensitivity of said pressure sensing cells according to said output signal levels while said presser is pressed against said seat.

2. The method as claimed in claim 1, wherein said step of pressing comprises a step of applying equal pressures on all said sensing cells and a step of removing said pressures.

3. The method as claimed in claim 2, wherein said presser comprises a flexible bag filled with liquid.

4. The method as claimed in claim 3, wherein said flexible bag has a surface area sufficient to apply said pressure on all said sensing cells concurrently.

5. The method as claimed in claim 3, wherein said flexible bag comprises a plurality of portions for separately applying pressures on a middle of said seat and sides of said seat.

6. The method as claimed in claim 1, further comprises a step of estimating final output signal levels before said step of adjusting.

7. The method as claimed in claim 6, wherein said step of estimating comprises a step of estimating a change in an output signal level of said sensing cells when said passenger seat is pressed by said presser.

8. The method as claimed in claim 7, wherein said step of estimating comprises a step of estimating a final output signal level according to a response relationship between pressure applied to said sensing cells and output signal levels of said sensor.

9. The method as claimed in claim 8, wherein said final output level is estimated according to a decreasing rate of output signal level of said sensing cell.

10. The method as claimed in claim 7, wherein said step of pressing comprises a preliminary step of pressing said presser and a main step of pressing said presser, and wherein the pressure applied at said preliminary step is larger than the pressure applied at said main step.

11. The method as claimed in claim 1, wherein said step of adjusting comprises separate steps of adjusting respective sensing cells.

12. The method as claimed in claim 1, wherein said steps of pressing, detecting and adjusting are carried out for those of said sensing cells disposed at predetermined sections of said passenger seat.

13. The method as claimed in claim 12, wherein said step of detecting comprises a step of providing a mean value of each different section, and said step of adjusting comprises a step of adjusting sensitivity of said pressure sensing cells of each different section according to said mean value thereof.

14. The method as claimed in claim 1, wherein said step of adjusting comprises a step of dividing said passenger seat to a plurality of sections, and a step of applying different weight of importance to each different section to provide a value to correct sensitivity of said each section.

15. The method as claimed in claim 1, wherein said step of adjusting comprises a step of dividing said passenger seat to a plurality of sections, and a step of correcting sensitivity of said sensing cells of each section.

16. The method as claimed in claim 15, wherein said plurality of sections comprises a central section disposed at the center of said passenger seat and a pair of side sections disposed at opposite sides of said central section.

17. The method as claimed in claim 15, wherein said step of detecting comprises a step of providing a mean value of each different section, and said step of adjusting comprises a step of adjusting sensitivity of said pressure sensing cells of each different section according to said mean value thereof.

18. The method as claimed in claim 1, wherein said presser comprises a bag having a contact surface fitted to the surface of said passenger seat.

19. The method as claimed in claim 17, wherein said presser comprises a plurality of bags having a contact surface fitted to the surface of each section of said passenger seat.

20. The method as claimed in claim 1, wherein said step of detecting comprises a step of detecting a shift of a distribution pattern of output signal levels of said sensing cells, and said step of adjusting comprises a step of correcting said shift according to said output signal levels.

21. The method as claimed in claim 20, wherein said step of correcting said shift comprises a step of estimating a shift of said distribution pattern, and a step of correcting said shift according to said estimated shift.

22. The method as claimed in claim 21, wherein said step of estimating a shift is carried out according to the signal levels of at least a pair of said sensing cells.

23. The method as claimed in claim 22, wherein each of said pair of sensing cells is disposed at portions of said passenger seat that are symmetrical with respect to the center of said passenger seat.

24. The method as claimed in claim 21, wherein said step of pressing comprises a step of pressing a presser against a central portion of said passenger seat, and said step of estimating comprises a step of estimating said shift according to output signal levels of sensing cells disposed outside said central portion.

25. The method as claimed in claim 21, wherein said step of pressing comprises a step of pressing a presser against a central portion of said passenger seat, and said step of estimating comprises a step of estimating said shift according to output signal levels of sensing cells disposed inside said central portion.

26. The method as claimed in claim 1, wherein said presser comprises means for profiling a surface of passenger's buttocks.

27. The method as claimed in claim 26, wherein said means comprises a plurality of pistons having edges, each of which is controlled to follow a portion of said surface of passenger's buttocks.

28. The method as claimed in claim 27, wherein said means further comprises a drive unit, and said plurality of pistons are moved by said drive unit according to a pattern of passenger's buttocks.

29. The method as claimed in claim 26, wherein said means comprises a plurality of pairs of a cylinder and a piston disposed in said cylinder to be driven thereby.

* * * * *